(12) United States Patent
Kennedy

(10) Patent No.: US 6,584,867 B2
(45) Date of Patent: Jul. 1, 2003

(54) SPUR GEAR TO INTERCONNECT RACK AND WORM

(75) Inventor: Paul G. Kennedy, Horseheads, NY (US)

(73) Assignee: Penn Troy Machine Co., Inc., Troy, PA (US)

( * ) Notice: Subject to any disclaimer, the term of this patent is extended or adjusted under 35 U.S.C. 154(b) by 0 days.

(21) Appl. No.: 09/885,641

(22) Filed: Jun. 20, 2001

(65) Prior Publication Data

US 2001/0042417 A1 Nov. 22, 2001

Related U.S. Application Data

(63) Continuation-in-part of application No. 09/094,514, filed on Jun. 10, 1998, now abandoned.

(51) Int. Cl.[7] .............................................. F16H 19/04
(52) U.S. Cl. ........................ 74/89.17; 74/422; 74/425; 251/249.5; 251/250
(58) Field of Search .......................... 74/422, 425, 458, 74/462, 89.17; 251/249.5, 250

(56) References Cited

U.S. PATENT DOCUMENTS

| 114,816 A | * | 5/1871 | Hiestand ...................... 74/425 |
| 619,047 A | * | 2/1899 | Mayer ......................... 74/422 |
| 1,864,605 A | * | 6/1932 | McCarty, Jr. ............. 251/249.5 |
| 1,943,693 A | * | 1/1934 | Ormsby et al. ............... 74/422 |
| 2,568,559 A | | 9/1951 | Nolde |
| 2,674,706 A | | 6/1954 | Knosp et al. |
| 2,688,881 A | * | 9/1954 | Crossland .................... 74/422 |
| 2,790,453 A | | 4/1957 | Maloney |
| 2,842,976 A | * | 7/1958 | Young ......................... 74/425 |
| 2,902,885 A | | 9/1959 | Wright |
| 2,931,424 A | | 4/1960 | Pickles |
| 3,248,970 A | | 5/1966 | Pickles |
| 3,595,094 A | | 7/1971 | Lemor |
| 3,934,852 A | | 1/1976 | Weber et al. |
| 4,040,682 A | | 8/1977 | Poulsen |
| 4,545,363 A | * | 10/1985 | Barchechat et al. ... 251/129.03 |
| 4,621,581 A | | 11/1986 | Kurimoto |
| 4,692,082 A | | 9/1987 | Smith |
| 5,222,408 A | | 6/1993 | Yoshida et al. |
| 5,285,360 A | | 2/1994 | Kanner |
| 5,483,853 A | | 1/1996 | Moradell et al. |

* cited by examiner

Primary Examiner—William C Joyce
(74) Attorney, Agent, or Firm—Brown & Michaels, PC

(57) ABSTRACT

A gear for use as the pinion in a rack and pinion gear includes spur gear teeth that have an upper portion of the face cut in a worm cut so the gear is effective as a worm wheel for a worm gear while retaining involute curved faces so it is effective as the pinion for the rack. The rack, pinion, and worm driver are connected. When the worm gear connected to a shaft, power is transmitted from the shaft to the rack via the worm driver and pinion with all gears making line contact instead of point contact. This improvement turns one gear piece into two gears. The rack pinion can be geared to a worm gear while it is also matched up with a straight cut rack. In this way the gear translates force between the two different types of gears.

8 Claims, 2 Drawing Sheets

SPUR GEAR TO INTERCONNECT RACK AND WORM

REFERENCE TO RELATED APPLICATIONS

This application is a continuation-in-part patent application of application Ser. No. 09/094,514, filed Jun. 10, 1998, now abandoned entitled "SPUR GEAR TO INTERCONNECT RACK AND WORM," the complete disclosure of which is hereby incorporated herein by reference.

BACKGROUND OF THE INVENTION

1. Field of the Invention

The invention pertains to the field of gears. More specifically, the invention pertains to a spur gear that has teeth cut for interfacing with both a worm driver and a rack.

2. Description of Related Art

Gears are toothed wheels used to transmit motion between components of a machine. Spur gears, also known as straight cut gears, are the most common type of gear. These gears, which are used to transmit power between two parallel shafts, have straight teeth parallel to the gear axis. Spur gears are classified as external, internal, or rack and pinion. External spur gears have teeth pointing outward from a center wheel. Internal gears have teeth pointing inward toward the gear axis. A rack and pinion combination transforms rectilinear motion into rotary motion and vice versa. The smaller of two gears is called the pinion. In a rack and pinion gear combination, the wheel is the pinion, because the rack is viewed as having an infinite pitch circle radius.

Worm gears are used to connect nonparallel, nonintersecting shafts at right angles. The worm has a helical tooth (thread) on its surface. The mating gear is the worm wheel. Worm gearing achieves large velocity reductions by using the worm as the driver and the worm wheel as the driven gear. The primary reasons for using industrial worm gearing are (1) to transmit power efficiently, (2) to transmit power at a considerable reduction in velocity, and (3) to provide a considerable mechanical advantage to overcome a comparatively high resisting force.

Due to the different interconnections involved, teeth for a spur gear are shaped differently from teeth for a worm wheel.

SUMMARY OF THE INVENTION

Briefly stated, a gear for use as the pinion in a rack and pinion gear includes spur gear teeth that have an upper portion of the face cut in a worm cut so the gear is effective as a worm wheel for a worm gear while retaining involute curved faces so it is effective as the pinion for the rack. The rack, pinion, and worm driver are connected. When the worm gear connected to a shaft, power is transmitted from the shaft to the rack via the worm driver and pinion with all gears making line contact instead of point contact. This improvement turns one gear piece into two gears. The rack pinion can be geared to a worm gear while it is also matched up with a straight cut rack. In this way the gear translates force between the two different types of gears.

According to an embodiment of the invention, a spur gear that interfaces with both a rack and a worm driver includes a wheel and a plurality of teeth spaced around the wheel, wherein each tooth includes opposing faces cut in a shaped curve such that the shaped curve satisfies the fundamental law of gear tooth action; an upper portion of each face cut in a worm cut; and a top land cut in a worm cut.

According to an embodiment of the invention, a gear combination includes a worm driver, a rack, and a spur gear interconnected between the worm driver and the rack, wherein a plurality of teeth of the spur gear have faces which satisfy the fundamental law of gear tooth action; an upper portion of each face is cut in a worm cut; and each tooth has a top land cut to match the worm driver.

According to an embodiment of the invention, a telescoping valve comprises a rack held in place by guide bushings, a spur gear that meshes with the rack, wherein the spur gear has a top land cut to interface with a worm gear, and wherein upper portions of the face of the spur gear that interfaces with the worm gear are concave cut to match the convex thread sides of the worm gear, and the worm gear being affixed to a rotating shaft, such that rotating the shaft rotates the worm gear, which in turn meshes with the spur gear, which meshes with the rack, such that power is transmitted from the shaft through to the rack, with all of the gears making line contact instead of point contact.

DETAILED DESCRIPTION OF THE INVENTION

The invention is a spur gear that is double-cut for use as both the pinion in a rack and pinion arrangement and as a worm for interfacing with a worm driver. The gear of the invention includes spur gear teeth that have an upper portion of the face cut in a worm cut, such that the gear is effective as a worm wheel for a worm gear, while the teeth retain shaped curved faces, such that the gear is also effective as the pinion for the rack. When the worm gear is connected to a shaft, power is transmitted from the shaft to the rack via the worm driver and pinion, with all gears making line contact, instead of point contact.

This invention effectively turns one gear piece into two gears. Thus, the pinion can be geared to a worm driver while it is also matched up with a straight cut rack. In this way the single gear piece translates force between the two different types of gears. The present invention also offers the benefits of being easily produced, increasing mechanical efficiency and decreasing gear wear, as it provides a rolling contact instead of a sliding contact.

Figure 1:
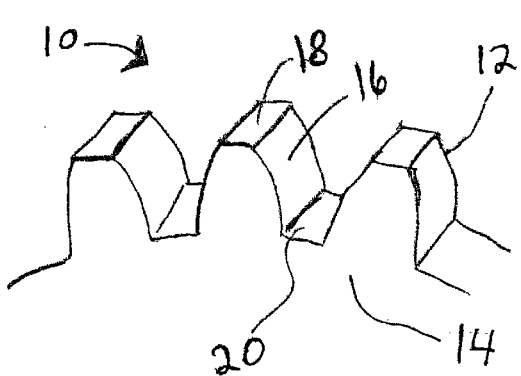
FIG. 1 shows a perspective view of a spur gear according to the prior art.

Referring to FIG. 1, a spur gear 10 includes a plurality of teeth 12 spaced around a wheel 14. Each tooth 12 includes a face 16, a top land 18, and a bottom land 20.

Figure 2:
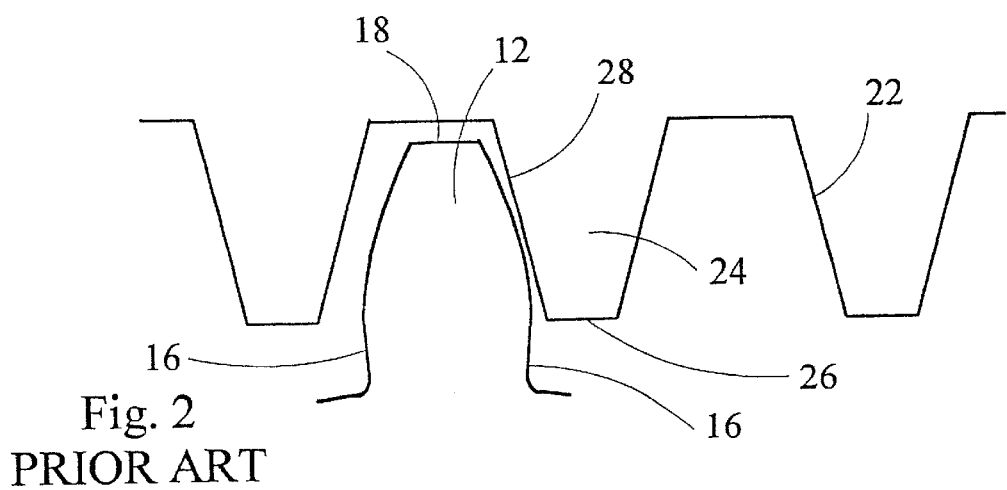
FIG. 2 shows a front view of a rack connected with a tooth of the spur gear of FIG. 1.

Referring to FIG. 2, tooth 12 is shown in profile. Top land 18 is flat, whereas face 16 is typically curved in an involute curve. When two gears mesh, this shaped curve satisfies the fundamental law of gear tooth action, which essentially states that the point of rolling contact (the "pitch point") between the teeth is on the centerline between the centers of each gear. When the teeth are in contact at other than the pitch point, the contact is a sliding contact instead of a rolling contact. Although a number of curves satisfy this property, historically only two curves have been used: the involute curve and the cycloid. A rack 22 includes a plurality of teeth 24, each with a top land 26 and a face 28. When designing a gear tooth using the involute curve, converting a wheeled gear to a rack requires treating the rack as a gear with infinite pitch circle radius. This means that the involute curve profile of tooth 24 in rack 22 is actually straight. This important property explains the popularity of rack and pinion gears, since it is relatively easy to manufacture racks.

Figure 3:
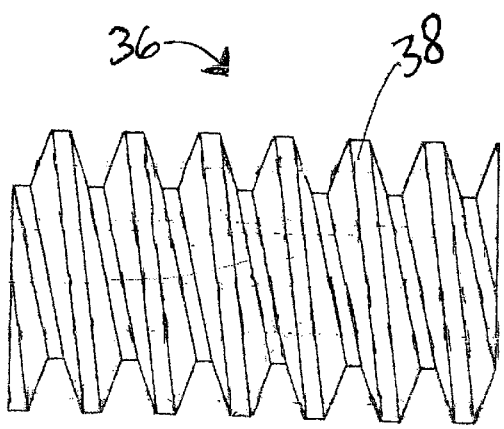
FIG. 3 shows an elevation view of a worm according to the prior art.

Referring to FIG. 3, a worm 36 has a helical tooth or thread 38 that winds around the worm from one end to the other. Worm 36 has a generally cylindrical cross section. Helical thread 38 has generally convex sides.

Figure 4:
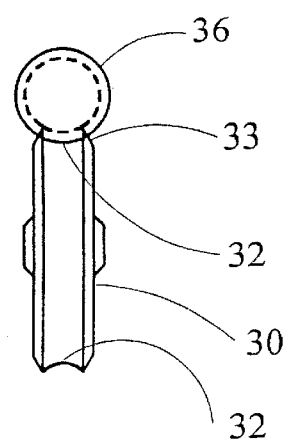
FIG. 4 shows a front view of a worm wheel and worm according to the prior art.
Figure 5:
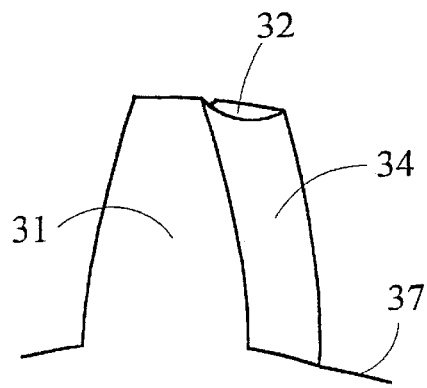
FIG. 5 shows a perspective view of the tooth of the worm wheel shown in FIG. 4.

Referring also to FIGS. 4 and 5, a worm wheel 30 includes a plurality of worm wheel teeth 31. Worm wheel tooth 31 includes a top land 32 that is cylindrically cut to match the cylindrical curve of worm 36. The cylindrical cut of top land 32 insures line contact between tooth 31 of worm wheel 30 and thread 38 of worm 36. A radius or chamfer 33 on tooth 31 points to a center of worm 36. The pitch of worm 36 is the axial distance from any point on a thread to the corresponding point on the next thread. The circular pitch of worm wheel 30 must equal the pitch of worm 36. An upper part of face 34 is concavely curved to match the convex curve of the threads 38 on worm 36. Any curvature of face 34 near a land 37 is not required for the worm wheel to worm connection and arises solely from the tooth cutting process.

Figure 6A:
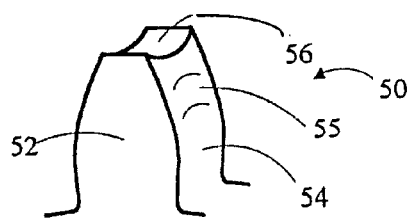
FIG. 6A shows a perspective view of a tooth of a gear according to an embodiment of the present invention.

Referring to FIG. 6A, a tooth 50 of a gear (not shown) of the present invention includes opposing sides 52 and opposing faces 54. Sides 52 are cut the same as a spur gear, that is, they are substantially straight with no chamfer at the top as with tooth 31 of worm wheel 30 (FIG. 4). Faces 54 are first cut as involute curves so that the gear of the present invention can connect with a rack. An upper portion 55 of face 54 is then cut with a concave worm cut to match the convex thread on the particular worm used. Unlike the top land 18 of spur gear tooth 12 (FIG. 2), a top land 56 of tooth 50 is cut to match the cylindrical curve of worm 36 (FIG. 3). Thus, the gear of the present invention connects with both a worm and a rack in line contact instead of point contact.

Figure 6B:
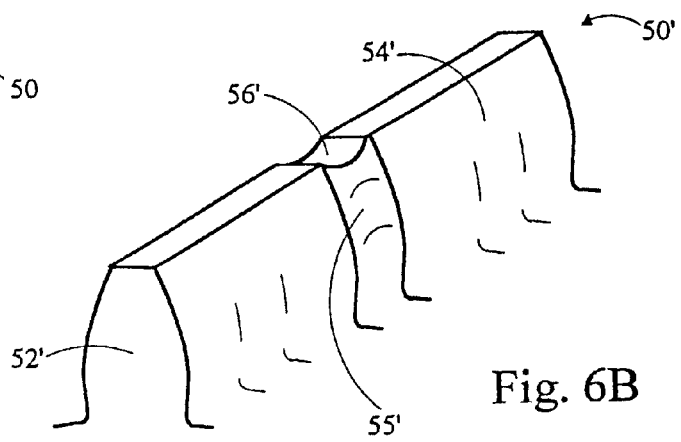
FIG. 6B shows a perspective view of a tooth of a gear according to an embodiment of the present invention.
Figure 7:
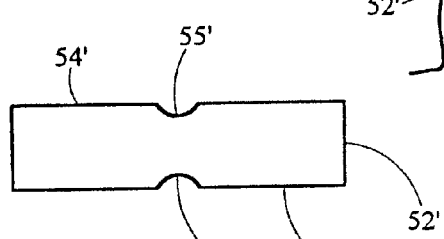
FIG. 7 shows a top surface of the tooth of FIG. 6B.

Referring to FIG. 6B and FIG. 7, a tooth 50' according to the present invention is similar to tooth 50 (FIG. 6A) except that it is wider to mesh with rack teeth (not shown) of similar size. The larger width of tooth 50' ensures more contact area between the rack teeth (not shown) and tooth 50'. A concave worm cut 55' is cut into a portion of face 54' to match the convex curve of the side of the worm thread (FIG. 3), while a cut 56' is cut into the top land of tooth 50' to match the cylindrical inner portion of the worm (FIG. 3). The remainder of faces 54' as well as the sides 52' are cut the same as for a spur gear.

Figure 8:
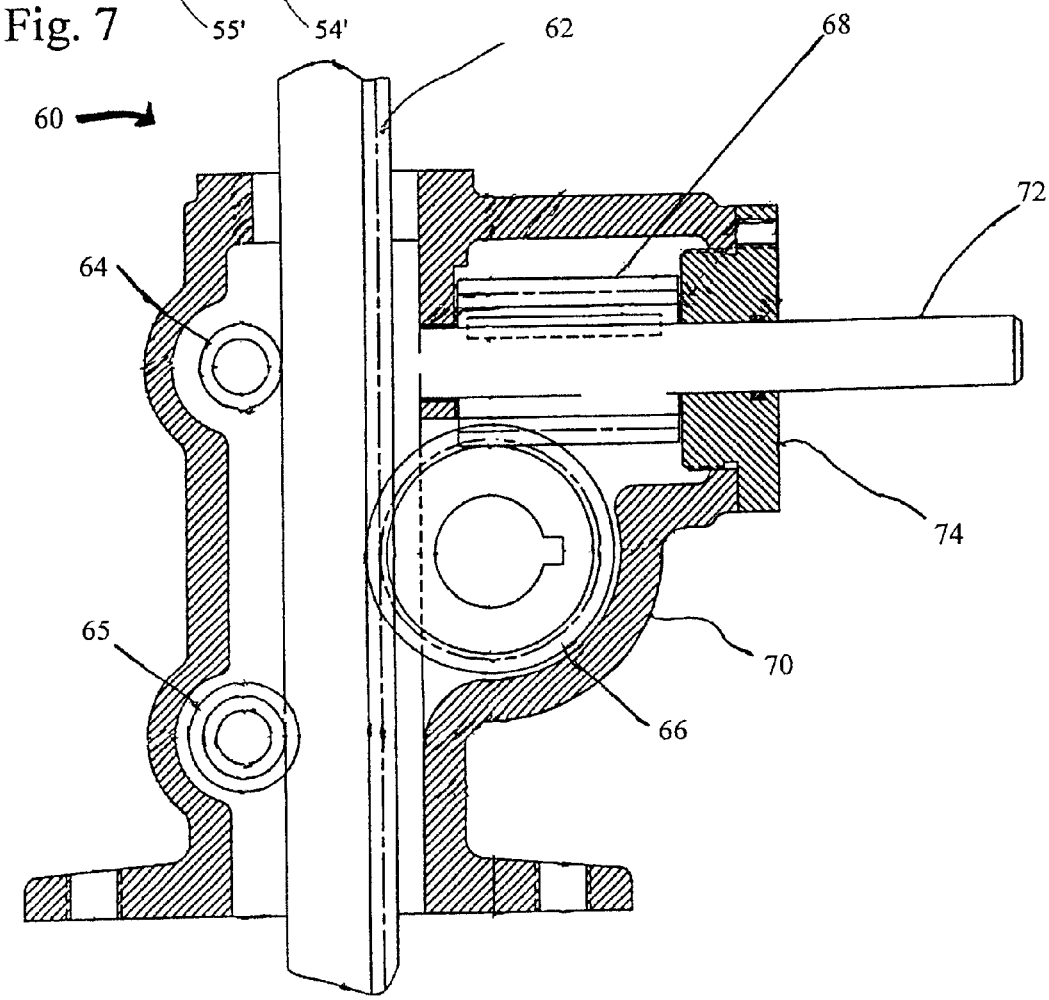
FIG. 8 shows a telescoping valve that includes a worm and rack connected by the gear of the present invention.

Referring to FIG. 8, a telescoping valve 60 includes a rack 62 held in place by guide bushings 64, 65. Rack 62 meshes with a spur gear 66 which has its top land cut to interface with a worm gear 68 and the upper portions of the face that makes contact with worm gear 68 are concave cut to match the convex thread sides of worm gear 68. Spur gear 66 is protected by a gear housing 70. Worm gear 68 is affixed to a shaft 72 which is held in place by a shaft plate 74. Rotating shaft 72 rotates worm gear 68, which in turn meshes with spur gear 66 which meshes with rack 62. Since the teeth of spur gear have involute curve lower faces and worm gear upper faces and worm gear top lands, power is transmitted from shaft 72 through to rack 62 with all the gears making line contact instead of point contact.

The spur gear of the present invention has the advantages that is it self-braking, and it increases the mechanical advantage in a smaller space than prior art spur gears, and further increases efficiency by decreasing the number of parts required in mechanical devices requiring gears, as the invention allows less spurs to be used, thereby decreasing the space occupied by the gears. In addition, the spur gear of the present invention allows an input shaft to turn at a ninety-degree angle from the gear, thereby obviating the need for the shaft to be parallel to the teeth of the spur gear.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A telescoping valve comprising:
  a rack held in place by guide bushings;
  a spur gear that meshes with said rack, wherein said spur gear has a top land cut to interface with a worm gear, and wherein upper portions of a face of said spur gear that interfaces with said worm gear are concave cut to match convex thread sides of said worm gear; and
  said worm gear being affixed to a rotating shaft, such that rotating said shaft rotates said worm gear, which in turn meshes with said spur gear, which meshes with said rack, such that power is transmitted from said shaft to said rack with all of said gears making line contact instead of point contact.

2. A valve according to claim 1, wherein said spur gear is self-braking.

3. A valve according to claim 1, wherein said spur gear has an involute curve.

4. A valve according to claim 3, wherein said spur gear is self-braking.

5. A telescoping valve comprising:
  a rack held in place by guide bushings;
  a spur gear, comprising
    a wheel; and
    a plurality of teeth spaced around said wheel, wherein each tooth includes opposing faces cut in a shaped curve, such that said shaped curve satisfies the fundamental law of gear tooth action;
    an upper portion of each said face cut having a worm cut; and
    a top land cut in a worm cut,
  wherein said spur gear meshes with said rack, and wherein said top land cut interfaces with a worm gear, and wherein upper portions of a face of said spur gear that interfaces with said worm gear are concave cut to match convex thread sides of said worm gear.

6. A valve according to claim 5, wherein said gear is self-braking.

7. A valve according to claim 5, wherein said shaped curve is an involute curve.

8. A valve according to claim 7, wherein said gear is self-braking.

* * * * *